(12) United States Patent
Scannell et al.

(10) Patent No.: US 10,875,656 B2
(45) Date of Patent: Dec. 29, 2020

(54) BI-FOLDING ENGINE COWL HAVING A PLURALITY OF OPEN POSITIONS TO PROVIDE ACCESS

(71) Applicant: Bell Helicopter Textron Inc., Fort Worth, TX (US)

(72) Inventors: Brent Scannell, Roxboro (CA); Thomas Mast, Carrollton, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 691 days.

(21) Appl. No.: 15/706,338

(22) Filed: Sep. 15, 2017

(65) Prior Publication Data

US 2019/0084685 A1 Mar. 21, 2019

(51) Int. Cl.
| | |
|---|---|
| *B64D 29/08* | (2006.01) |
| *B64C 27/00* | (2006.01) |
| *B64C 1/14* | (2006.01) |
| *B64D 29/06* | (2006.01) |

(52) U.S. Cl.
CPC ............ *B64D 29/08* (2013.01); *B64C 1/1446* (2013.01); *B64C 27/00* (2013.01); *B64D 29/06* (2013.01)

(58) Field of Classification Search
CPC ........ B64D 29/08; B64D 29/06; B64C 27/00; B64C 1/1446
See application file for complete search history.

(56) References Cited

U.S. PATENT DOCUMENTS

| | | | |
|---|---|---|---|
| 4,448,232 A | 5/1984 | McQueen et al. | |
| 4,613,099 A | 9/1986 | Smith et al. | |
| 6,227,485 B1 | 5/2001 | Porte | |
| 7,275,717 B2 | 10/2007 | Landry | |
| 2004/0238687 A1 | 12/2004 | Jones et al. | |
| 2006/0261216 A1 | 11/2006 | Landry | |
| 2011/0174929 A1* | 7/2011 | Rowbut | E05B 17/2038 244/131 |
| 2013/0097940 A1 | 4/2013 | Brown et al. | |
| 2014/0334922 A1 | 11/2014 | Fabre et al. | |
| 2016/0031563 A1 | 2/2016 | Pautis | |

(Continued)

FOREIGN PATENT DOCUMENTS

| | | |
|---|---|---|
| EP | 3059157 A1 | 8/2016 |
| EP | 3418183 B1 | 12/2019 |

(Continued)

OTHER PUBLICATIONS

EPO Search Report issued in EP Application 19201124.4 dated Feb. 18, 2020, 5 pages.

(Continued)

*Primary Examiner* — Assres H Woldemaryam
(74) *Attorney, Agent, or Firm* — Patent Capital Group

(57) ABSTRACT

In one embodiment of the present disclosure, there is provided an aircraft having a bi-folding cowl for providing full access to equipment without completely removing the cowl. The bi-folding cowl has an upper portion and a lower portion mechanically connected along the adjacent edges, where the upper and lower portions fold so that the inner surfaces face each other when opened. In another embodiment, the bi-folding cowl has at least three maintenance positions, including partially-opened, fully-opened, and fully-opened, lying flat on the surface of the aircraft.

16 Claims, 7 Drawing Sheets

(56) References Cited

U.S. PATENT DOCUMENTS

| | | | |
|---|---|---|---|
| 2016/0264249 A1 | 9/2016 | Lozano et al. | |
| 2018/0057183 A1* | 3/2018 | Le Cadet | B64D 29/06 |
| 2018/0086473 A1* | 3/2018 | Joel | B64D 29/08 |
| 2019/0061902 A1* | 2/2019 | Scannell | B64C 1/1415 |

FOREIGN PATENT DOCUMENTS

| | | |
|---|---|---|
| FR | 2933071 A1 | 1/2010 |
| FR | 2933071 B1 | 6/2010 |
| WO | 2012148394 A1 | 11/2012 |

OTHER PUBLICATIONS

"Mermie Karger, 1938 Rolls-Royce Phantom III @ Pebble Beach," youtube Feb. 10, 2011, XP054977914, 2 pages; retrieved from the Internet: https://www.youtube.com/watch?v=GC75Sf8dHKk [retrieved on Nov. 24, 2017] *Video of 1938 Rolls-Royce Phantom III. See engine cowl opening at minute 2:33 of the video, the cowl being folded and rotated to lay on a surface above opening.*.

EPO Search Report issued in EP Application 17196020.6 dated Apr. 23, 2017, 4 pages.

EPO Examination Report issued in EP Application 19201134.4 dated Apr. 14, 2020, 6 pages.

EPO Official Action issued in EP Application 17196021.4 dated Feb. 16, 2018, 6 pages.

"Mermie Karger, 1938 Rolls-Royce Phantom III @ Pebble Beach," youtube, Feb. 10, 2011 (Feb. 10, 2011), XP054977914, 2 pages; retrieved from the Internet: URL:https://www.youtube.com/watch?v=GC75Sf8dHKk [retrieved on Nov. 24, 2017] *Video of 1938 Rolls-Royce Phantom III. See engine cowl opening at minute 2:33 of the video, the cowl being folded and rotated to lay on a surface above opening.*.

EPO Search Report issued in EP Application 17196021.4 dated Dec. 12, 2017, 6 pages.

Bell 525 Relentless (Product Diagram), Bell Helicopter, A Textron Company; Flight International from Flightglobal, Tim Hall (FRAeS, Fort Worth, Texas), Reed Business Information, Published Nov. 12, 2014. (1 page).

Perry, Dominic, "Analysis: Bell 525 Relentless Cutaway and Technical Description", Flight Global, Flight International, Bell Helicopter, Published Nov. 12, 2014. (8 pages).

EPO Examination Report issued in EP Application 17196021.4 dated May 16, 2018, 5 pages.

USPTO Non-Final Office Action for U.S. Appl. No. 15/706,366 dated Jun. 23, 2020.

* cited by examiner

BI-FOLDING ENGINE COWL HAVING A PLURALITY OF OPEN POSITIONS TO PROVIDE ACCESS

TECHNICAL FIELD

This disclosure relates generally to an aircraft access panel, and more particularly, though not exclusively, to a bi-folding engine cowl.

BACKGROUND

An aircraft generally includes a fuselage in which access openings are provided. Some access openings are designed to enable access to equipment areas such as aircraft engines to perform service and maintenance on the equipment. Each access opening typically is equipped with a cowling having limited opening ability unless the cowling is removed. Further, the cowling may be heavy and may require more than one person to open and/or remove the cowling.

SUMMARY

According to one aspect of the present disclosure, there is provided an aircraft that includes a bi-folding cowl for an equipment access opening having a plurality of positions for holding the cowl open to perform maintenance. The bi-folding cowl has an upper portion and a lower portion connected along their respective bottom edge and top edge by a mechanical means, such as, a hinge. In various embodiments, the bi-folding cowl may be opened by moving the lower portion upwardly and inwardly towards the upper portion to provide full access to the equipment without completely removing the cowling.

According to one aspect of the present disclosure, the bi-folding cowl has at least three maintenance positions, including partially-opened, fully-opened, and fully-opened, lying flat on the surface of the aircraft. When in the partially-opened position, the lower section of the bi-folding cowl may be moved upwardly and the bottom edge of the lower section may be fed into and supported by a notch on a firewall or other structure. When in the fully-opened position, the bi-folding cowl may be folded upward and inward, such that the inside faces of the upper and lower portions of the cowl face each other. The bi-folding cowl, then, may be locked into a track to hold the folded door in a fully-opened position. When in the fully-opened, lying flat position, the folded door may be rotated backwards to lay on the surface of the aircraft.

DETAILED DESCRIPTION

Figure 1A:
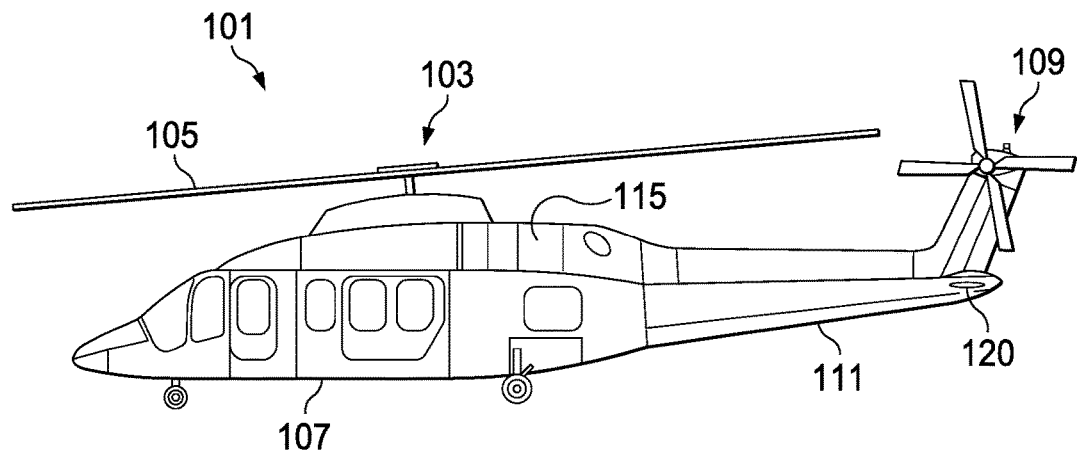
FIGS. 1A, 1B, and 2 illustrate example aircraft in accordance with certain embodiments.

An aircraft equipment door includes a bi-folding cowl having three distinct open positions to allow access for maintenance and service. The bi-folding cowl may have an upper portion, also referred to herein as section, and a lower portion that are mechanically connected, for example, by a hinge. The upper portion of the bi-folding coal is positioned closer to the top side of the aircraft when the cowl is in the closed position. The lower portion of the cowl is positioned closer to the bottom side of the aircraft when in the cowl is in the closed position. The three distinct open positions include partially open, fully-opened, and fully-opened, lying flat on the top surface of the aircraft. The bi-folding cowl structure may further include hold open rod assemblies, quick release pins for hinges, strut channels or tracks, and notches or other holders on surrounding structures for supporting the bi-folding cowl in the partially-opened, fully-opened, and fully-opened, lying flat positions.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

As used herein, the terms door, access panel, cowl, cowling, and fairing may be used interchangeably. Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1B:
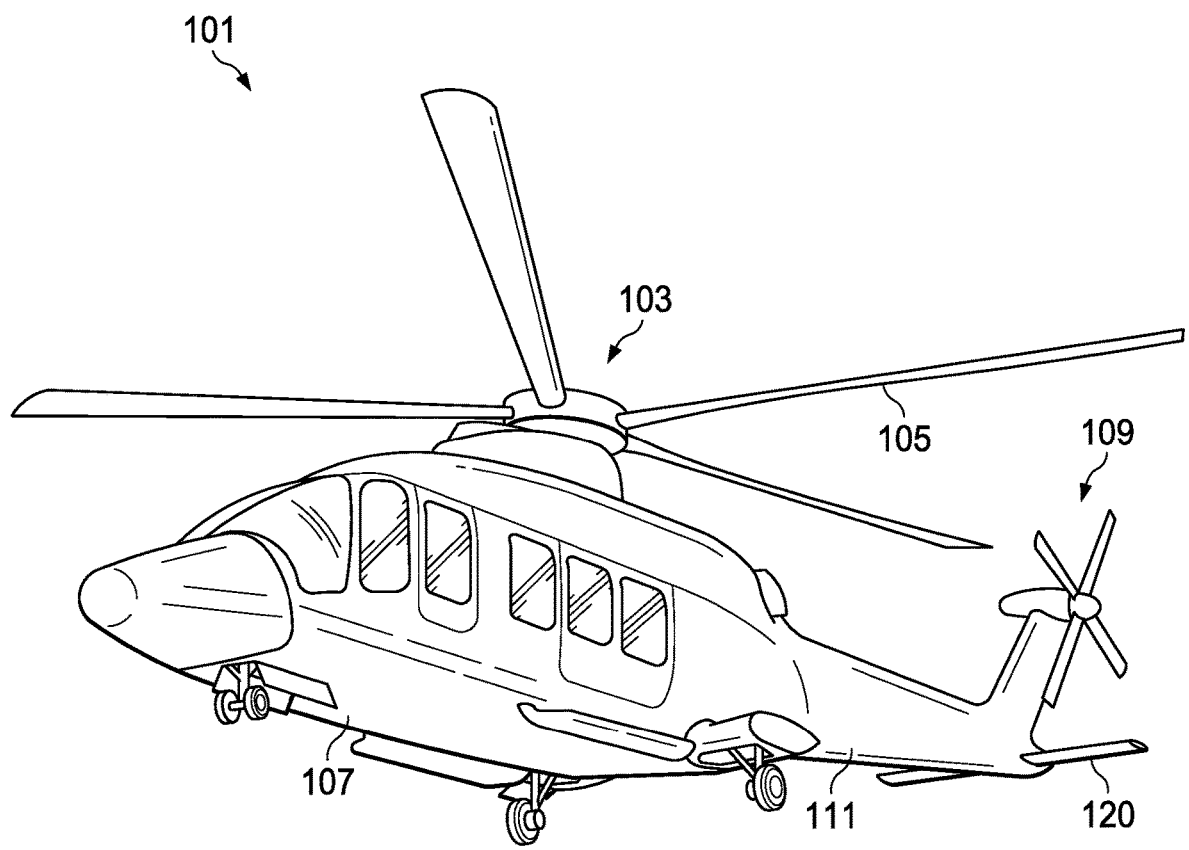
Figure 2:
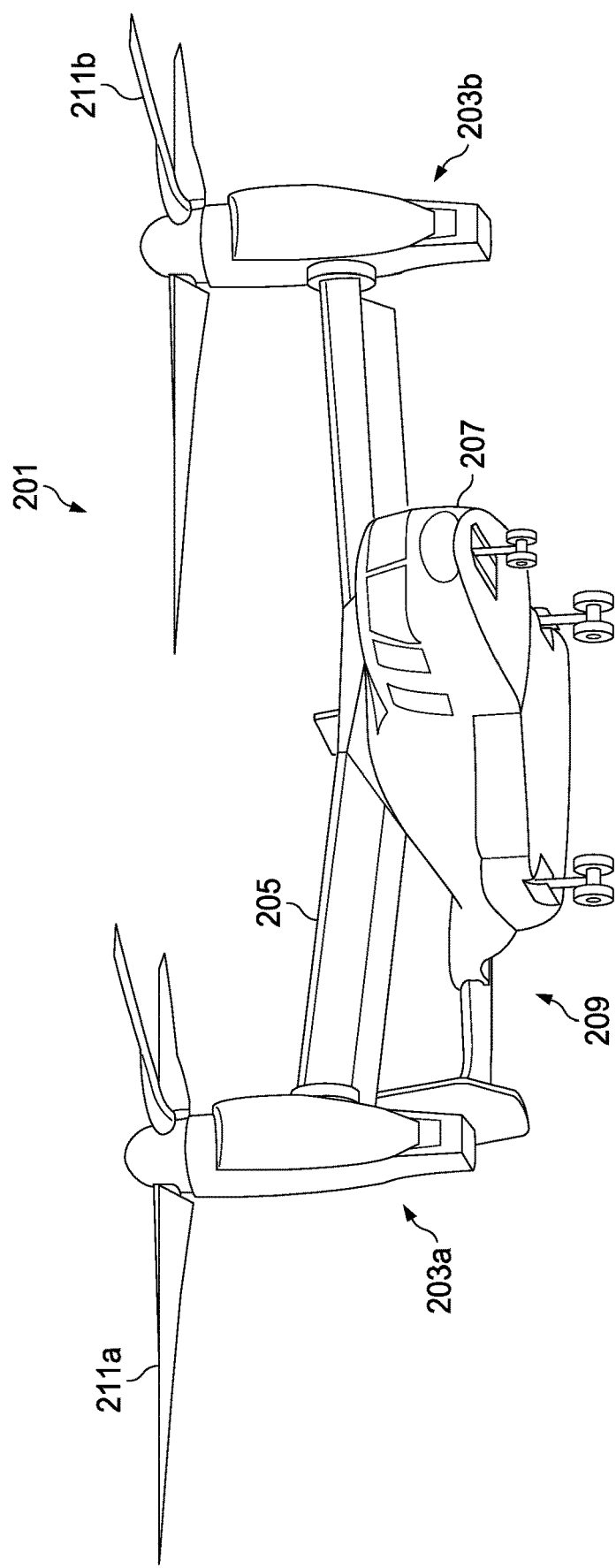

FIGS. 1A, 1B, and 2 illustrate various example aircraft in accordance with certain embodiments, as discussed further below.

FIGS. 1A and 1B illustrate an example embodiment of a rotorcraft 101. FIG. 1A illustrates a side view of rotorcraft 101, while FIG. 1B illustrates a perspective view of rotorcraft 101. Rotorcraft 101 has a rotor system 103 with a plurality of rotor blades 105. The pitch of each rotor blade 105 may be managed or adjusted in order to selectively control direction, thrust, and lift of rotorcraft 101. Rotorcraft 101 further includes a fuselage 107, anti-torque system 109, an empennage 111, and a tail structure 120. In this example, tail structure 120 can represent a horizontal stabilizer. Torque is supplied to rotor system 103 and anti-torque system 109 using at least one engine. FIG. 1A further illustrates an engine cowl 115 for covering a rotorcraft engine. Similarly, another engine cowl (not shown) would cover another engine housed on the opposite side of rotorcraft 101.

FIG. 2 illustrates a perspective view of an example tiltrotor aircraft 201. Tiltrotor aircraft 201 can include nacelles 203a and 203b, a wing 205, a fuselage 207, and a tail structure 209. In this example, tail structure 209 can represent a vertical stabilizer. Each nacelle 203a and 203b can include an engine and gearbox for driving rotor systems 211a and 211b, respectively. Nacelles 203a and 203b are each configured to rotate between a helicopter mode, in which the nacelles 203a and 203b are approximately vertical, and an airplane mode, in which the nacelles 203a and 203b are approximately horizontal.

It should be appreciated that rotorcraft 101 of FIGS. 1A and 1B, and tiltrotor aircraft 201 of FIG. 2 are merely illustrative of a variety of aircraft that can be used to implement embodiments of the present disclosure. Other aircraft implementations can include, for example, fixed wing airplanes, hybrid aircraft, unmanned aircraft, gyrocopters, and a variety of helicopter configurations, among other examples. Moreover, it should be appreciated that even though aircraft are particularly well suited to implement embodiments of the present disclosure, the described embodiments can also be implemented using non-aircraft vehicles and devices.

An aircraft including a bi-folding cowl. The bi-folding cowl, also referred to herein as "bi-folding door" and simply "door," having an upper section and a lower section that are pivotally connected on their adjacent edges (e.g., hinged together). In some embodiments, the upper and lower sections may swing freely in relation to one another where the upper section may be moved upwardly and the lower door section may be moved inwardly to fold together, such that the inside surfaces of the upper and lower sections face each other when in the fully-opened position. The three distinct open positions include partially open, fully-opened, and fully-opened, lying flat on the top surface or work platform of the aircraft. In some embodiments, the upper and lower sections of the bi-folding cowl may be mounted on a track, or the like, such that the upper and lower sections move according to the track, for example, upwardly and inwardly to fold together. The lower cowl section and, optionally, the upper cowl section may be attached to the track for guiding the opening and closing of the bi-folding cowl. The track may provide notches, or other like structures, for holding the bi-folding cowl in the partially open, fully-opened, and fully-opened, lying down positions. The upper and lower sections may be of any suitable size and shape to enable opening to a fully-opened position and to assure that the door closes completely. For example, the upper and lower door sections may be approximately the same size and shape. In another example, the upper portion may be larger than the lower portion. In some embodiments, the bi-folding door structure may further include one or more hold open rod assemblies, quick release pins, strut channels, and supports on surrounding structures for holding the bi-folding cowl in the partially-opened, fully-opened, and fully-opened, lying flat positions.

The embodiments described throughout this disclosure provide numerous technical advantages, including providing full access to equipment for performing maintenance and service without having to remove the access panel. Further, the bi-folding door enables a single maintenance worker to open and close the door while providing full access to the equipment.

Example embodiments that may be used to implement the bi-folding door for accessing equipment, such as an engine cowl, and other areas of the aircraft, such as storage areas, are described below with more particular reference to the remaining FIGURES.

Figure 3A:
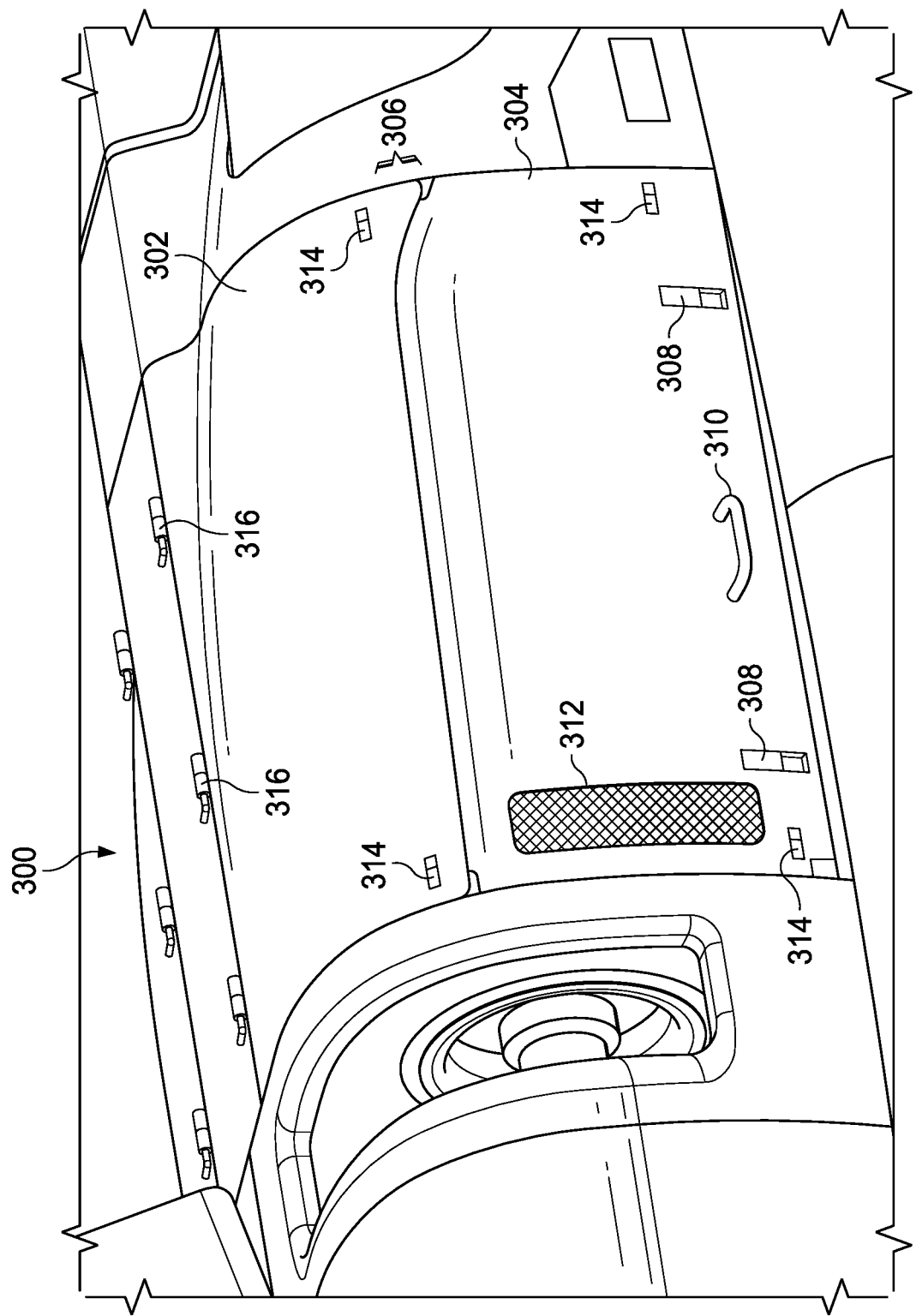
FIG. 3A illustrates a bi-folding engine cowl in a fully closed position, in accordance with various embodiments.

FIG. 3A illustrates a bi-folding engine cowl in a fully closed position, in accordance with various embodiments. As shown in FIG. 3A, bi-folding cowl 300 includes an upper door portion 302 and a lower door portion 304. The upper portion 302 is positioned closer to the top of the aircraft when the cowl is in a closed position. The lower portion 304 is positioned closer to the bottom of the aircraft when the cowl is in a closed position. The upper and lower portions have opposing inner and outer surfaces, where the inner surface faces inwards (towards the inside of the fuselage) and the outer surface faces outwards (towards the outside of the aircraft) when the cowl is in the closed position. The upper and lower portions may be mechanically connected along their adjacent edges or sides 306 so that the sections pivot or rotate relative to each other. Mechanically connected may refer to using any suitable mechanical assembly, for example, a hinge, a rod, a hinge strut, a quick release pin, or the like, to pivotally connect the upper and lower portions together. The upper portion 302 may by connected to the aircraft by any suitable means, for example, quick release pins 316, which enables the cowl to be fully removed from the aircraft. The upper 302 and lower 304 portions may be any suitable size, shape, and contour for the particular access area in the aircraft fuselage. As shown in FIG. 3A, the upper 302 and lower 304 portions are of approximately equal size and shape. Bi-folding cowl 300 may be constructed of any suitable material, such as steel or other metal, and may be made of the same material as the aircraft fuselage. Bi-folding cowl 300 may be constructed using any suitable process and design; for example, bi-folding cowl 300 may be constructed of a steel frame covered by a sheet material.

Bi-folding cowl 300 may include latching mechanisms 308, 314 for closing and/or locking the bi-folding door when in the closed position, for example, hasp clasps, compression latches, draw latches, and the like. Bi-folding cowl 300 may include a handle 310 for facilitating opening and closing. Handle 310 may be, for example, a stationary external handle, a retractable handle that stores flush with the surface of the aircraft, or any other suitable handle. Handle 310 may be a single handle or may be more than one handle, and may be placed anywhere on the bi-folding cowl 300 to permit opening and closing. Handle 310 should be sufficiently durable and sturdy to support the weight of the cowl and provide stability when opening and closing. Bi-folding cowl 300 may include additional features necessary for the aircraft and equipment, such as air vents 312, among other features. Bi-folding door 300 may further include weather stripping or other material for sealing and protecting against rust and other types of weather damage. Although only one bi-folding door is shown, it may be understood that a second bi-folding engine cowl having the same or similar features may cover the engine on the opposite side of the aircraft.

Figure 3B:
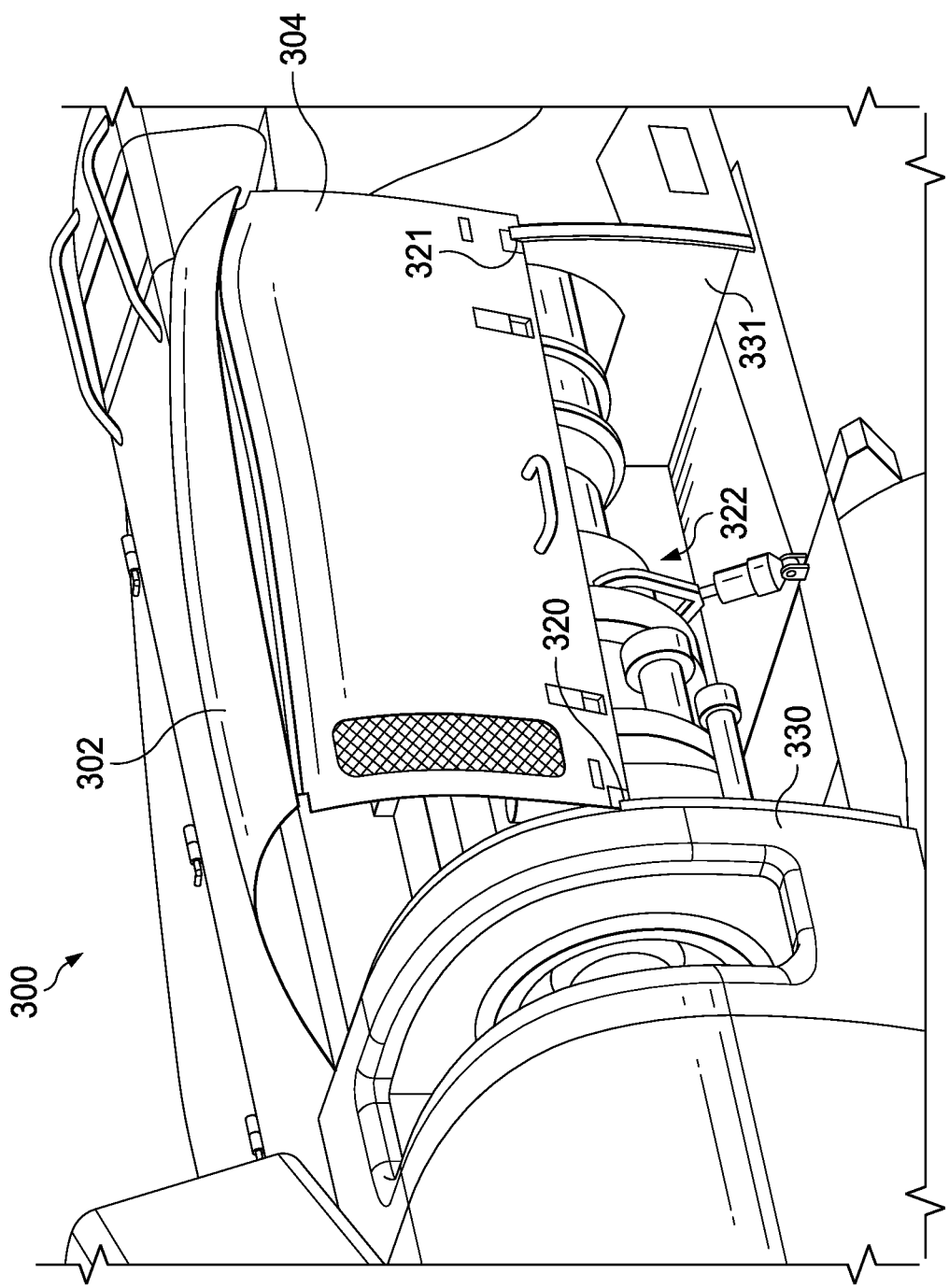
FIG. 3B illustrates a bi-folding engine cowl in a partially-opened position, in accordance with various embodiments.

FIG. 3B illustrates a bi-folding cowl in a partially-opened position, in accordance with various embodiments. FIG. 3B shows bi-folding engine cowl 300 having upper portion 302 and lower portion 304 in a partially-opened position where the bottom edge of the lower portion 304 of the bi-folding cowl 300 is fed into one or more notches 320, 321 and held open. Notch 320, 321 may be any suitable size and shape, for example, V-shaped, L-shaped, or L-shaped with a recessed portion, to support and hold the bi-folding cowl 300 in a partially-opened position. Notch 320, 321 may be made of any suitable material, such as steel. Although two notches are shown, it may be understood that one or more notches may support and hold the bi-folding cowl in a partially-opened position. In some embodiments, notch 320, 321 may be incorporated into a surrounding structure, such as, a firewall 330, 331. The engine compartment usually includes parallel firewalls 330, 331 on either side of the engine, which may provide a support structure to the bi-folding cowl when in the closed position and may provide a support for holding the bi-folding cowl in the partially-opened position. In other embodiments, other structures, including fuselage structures, guide rails, and additional structures, may provide support for holding the cowl in an opened position.

In some embodiments, the lower portion of the bi-folding cowl may rotate 360 degrees with respect to the upper portion of the bi-folding cowl such that the lower portion may move upwardly and outwardly while the upper portion simply moves upwardly and rotates around the horizontal axis of its upper edge where it is attached to the aircraft. In some embodiments, notch 320, 321 may be a separate structure built specifically to support the bi-folding cowl in the partially-opened position (not shown). As a separate structure, the notch may be built on a track or frame to which the bi-folding cowl may be attached by guide rollers and/or column followers. The track or frame may act to restrict pivotal movement of the upper and lower portions, and define the movement of the bi-folding cowl. For example, the separate structure may be attached to equipment contained in the access compartment, a surface of the access compartment, or a firewall, among others. In some embodiments, bi-folding cowl may include a hold open rod assembly, a quick release pin assembly, or a strut channel assembly, among others, for holding the bi-folding cowl in the partially-opened position.

As shown in FIG. 3B, when the bi-folding engine cowl is in the partially-opened position, the lower portion of the engine 322 may be accessed. Notch 320, 321 may be positioned to optimize engine accessibility, such that, more or less of the engine is accessible when bi-folding cowl 300 is in the partially-opened position.

Figure 3C:
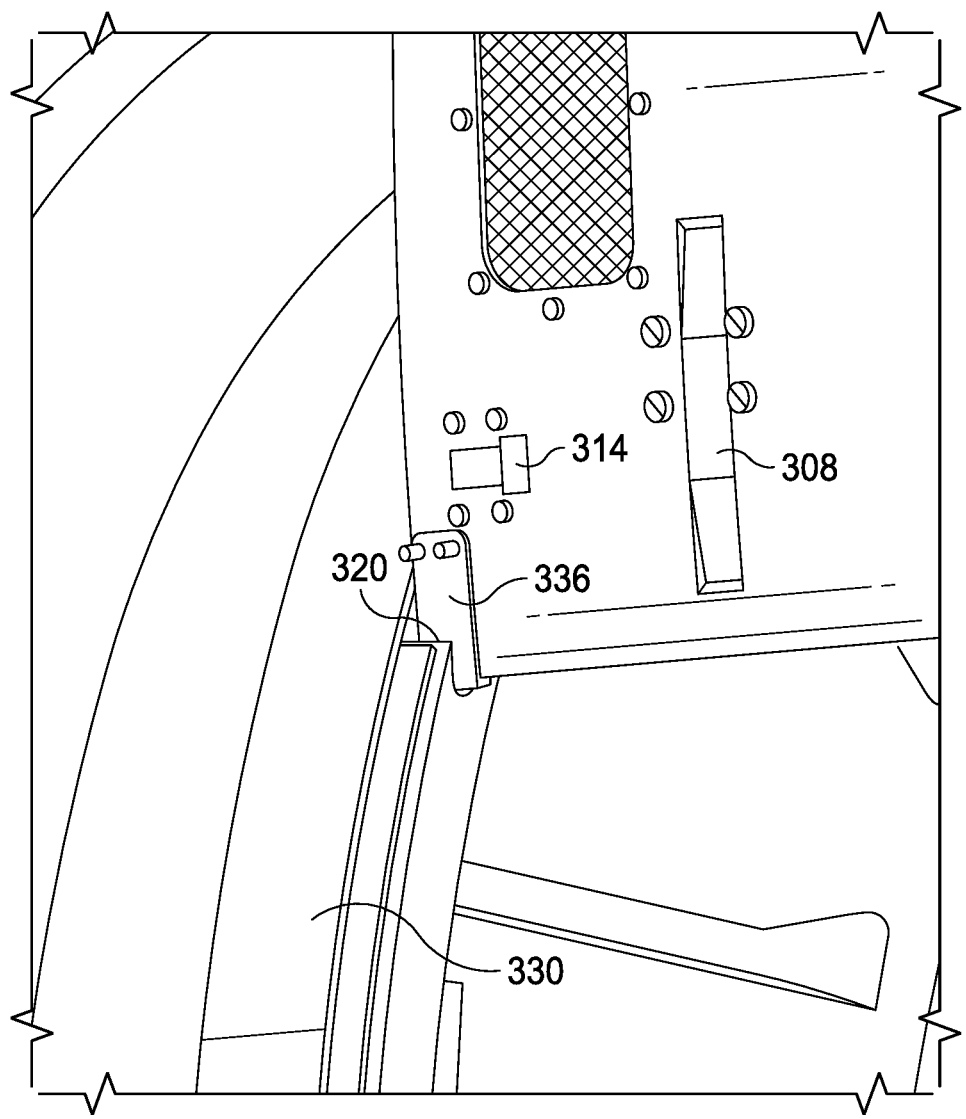
FIG. 3C is a magnified view of an area of FIG. 3B and illustrates the support mechanism for holding a bi-folding engine cowl in a partially-opened position, in accordance with various embodiments.

FIG. 3C, which is a magnification of the area surrounding support notch 320 indicated in FIG. 3B, illustrates support notch 320 incorporated into firewall 330 holding a bi-folding engine cowl in a partially-opened position, in accordance with various embodiments. As shown in FIG. 3C, the bottom edge of the lower portion of the bi-folding cowl is fed into notch 320. Bottom edge of lower portion 304 may include additional material 336 to protect the area supported by the notch, such as a metal sheet, or may include additional material to provide resistance, such as rubber or other material which may have a textured surface, so that the door stays in the notch until moved.

Figure 3D:
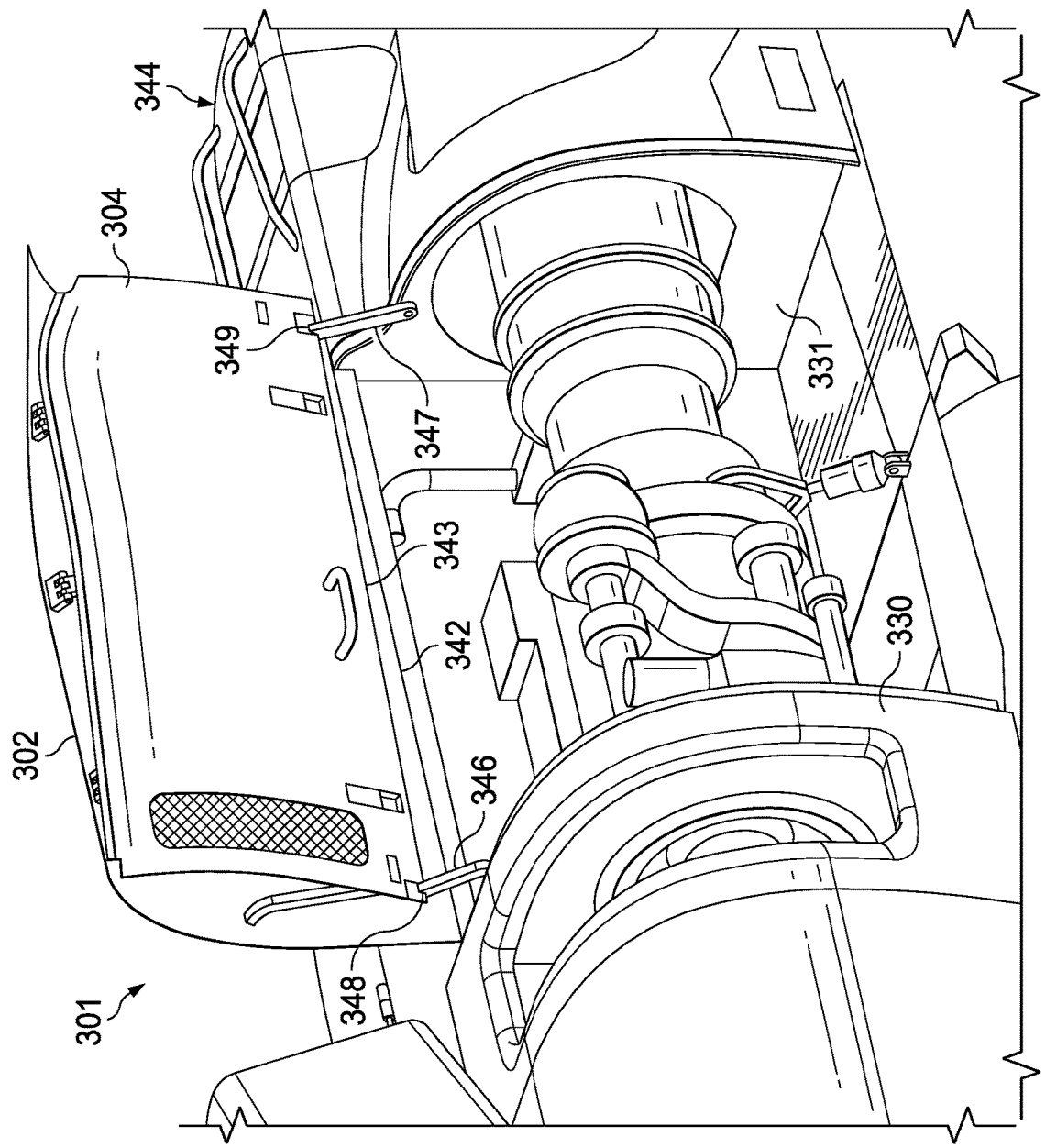
FIG. 3D illustrates a bi-folding engine cowl in a fully-opened position, in accordance with various embodiments.

FIG. 3D illustrates bi-folding engine cowl in a fully-opened position, in accordance with various embodiments.

As shown in FIG. 3D, bi-folding cowl 301 may be folded upwardly and inwardly where the inner faces of upper cowl portion 302 and lower cowl portion 304 face each other when in the fully-opened position. When in the fully-opened position, the top edge 342 of the upper portion 302 and bottom edge 343 of the lower portion 304 may be positioned to rest on or above the top surface of the aircraft 344 (also referred to herein as the work platform). In some embodiments, the mechanism to support and hold the bi-folding cowl in the fully-opened position maybe included on the work platform of the aircraft 344. The engine is fully accessible when the bi-folding cowl is in the fully-opened position without having to remove the cowl from the aircraft.

In some embodiments, as shown in FIG. 3D, the bi-folding cowl may be attached to a track 346, 347 that may include a notch 348, 349, or other mechanical structure, for supporting and holding bi-folding door in the fully-opened position. The track may be a vertical track that may include a bearing surface for supporting and holding the bi-folding cowl in a fully-opened position. In some embodiments, bi-folding cowl may include a hold open rod assembly, a quick release pin assembly, or a strut channel assembly, among others, for holding the bi-folding cowl in the fully-opened position. In some embodiments, the mechanical structure for holding the bi-folding cowl in a fully-opened position may be removably attached to the cowl and/or the aircraft, such that the mechanical structure may be removed from the aircraft and/or the cowl. If an aircraft has two engines that are located on either side of the aircraft and each engine has a bi-folding engine cowl, both bi-folding cowls may be in the fully-opened position without interfering with each other.

Figure 3E:
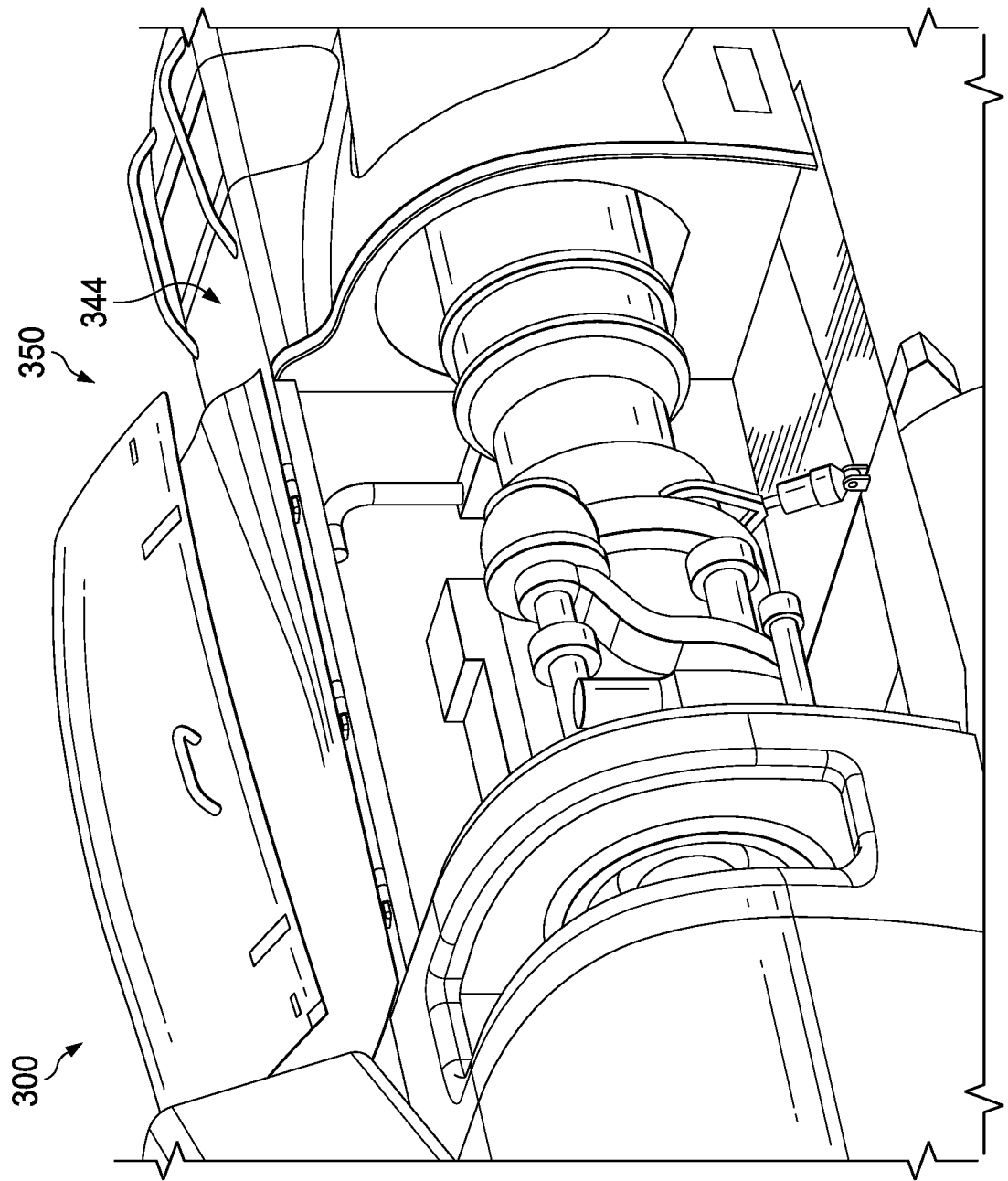
FIG. 3E illustrates a bi-folding engine cowl in a fully-opened, lying flat position, in accordance with various embodiments.

FIG. 3E illustrates a bi-folding engine cowl in a fully-opened, lying flat position, in accordance with various embodiments. FIG. 3E illustrates bi-folding cowl 300 in a fully-opened position where the bi-folding cowl is lying flat 350 on the surface of the aircraft work platform 344. The engine is fully accessible when the bi-folding cowl is in this position without having to remove the cowl from the aircraft. When in the fully-opened, lying flat position, the bi-folding cowl may be secured using a latch or other mechanism to keep the cowl securely opened (not shown).

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft bi-folding engine cowl comprising:
an upper portion; and
a lower portion, wherein the upper portion and the lower portion are mechanically connected on adjacent edges; and
wherein the aircraft bi-folding engine cowl comprises three distinct open positions:
i. a first position, wherein the upper portion and lower portion are fully folded along an adjacent edge in a fully opened position;
ii. a second position, wherein the upper portion and the lower portion are partially folded along the adjacent side in a partially-opened position; and
iii. a third position, wherein the upper portion and lower portion are fully folded along the adjacent side and rotated to lay on a top surface of an aircraft.

2. The aircraft bi-folding engine cowl of claim 1, wherein the aircraft bi-folding engine cowl is attached to a track to guide the opening of the aircraft bi-folding engine cowl to one or more of the three distinct open positions.

3. The aircraft bi-folding engine cowl of claim 1, wherein the aircraft bi-folding engine cowl, when in the second position, is supported by a structure on a firewall.

4. The aircraft bi-folding engine cowl of claim 1, wherein the aircraft bi-folding engine cowl, when in the second position, is supported by one or more of: a hold open rod assembly, a quick release pin assembly, and a strut channel assembly.

5. An apparatus, comprising:
a bi-folding cowl on an aircraft access opening, the bi-folding cowl comprising:
an upper portion; and
a lower portion, wherein the upper portion and the lower portion are mechanically connected on adjacent sides, and
wherein the bi-folding cowl comprises three distinct open positions:
i. a first position, wherein the upper portion and lower portion are folded along an adjacent side in a fully-opened position;
ii. a second position, wherein the upper portion and the lower portion are partially folded along the adjacent side in a partially-opened position; and
iii. a third position, wherein the upper portion and lower portion are fully folded along the adjacent side and rotated to lay on a surface above the aircraft access opening.

6. The apparatus of claim 5, wherein the bi-folding cowl is attached to a track to guide the opening of the bi-folding cowl to one or more of the three distinct open positions.

7. The apparatus of claim 6, wherein the bi-folding cowl, when in the second position, is supported by a structure on the track.

8. The apparatus of claim 5, wherein the bi-folding cowl, when in the second position, is supported by one or more of: a hold open rod assembly, a quick release pin assembly, and a strut channel assembly.

9. A rotorcraft, comprising:
an equipment access opening having a bi-folding cowl, the bi-folding cowl comprising:
an upper portion; and
a lower portion, wherein the upper portion and the lower portion are mechanically connected on adjacent sides; and
wherein the bi-folding cowl comprises three distinct open positions:
i. a first position, wherein the upper portion and lower portion are folded along an adjacent side in a fully-opened position;
ii. a second position, wherein the upper portion and the lower portion are partially folded along the adjacent side in a partially-opened position; and
iii. a third position, wherein the upper portion and lower portion are fully folded along the adjacent side and rotated to lay on a top surface of the rotorcraft.

10. The rotorcraft of claim 9, wherein the bi-folding cowl is attached to a track to guide the opening of the bi-folding cowl to one or more of the three distinct open positions.

11. The rotorcraft of claim 9, wherein the bi-folding cowl, when in the second position, is supported by a structure on a firewall.

12. The rotorcraft of claim 9, wherein the bi-folding cowl, when in the second position, is supported by one or more of: a hold open rod assembly, a quick release pin assembly, and a strut channel assembly.

13. An aircraft bi-folding cowl comprising:
an upper portion having an inner surface and an opposing outer surface, wherein the upper portion is positioned closer to a top side of an aircraft when the aircraft bi-folding cowl is in a closed position;
a lower portion having an inner surface and an opposing outer surface, wherein the lower portion is positioned closer to a bottom side of the aircraft when the aircraft bi-folding cowl is in the closed position;
wherein the upper portion and the lower portion are pivotally connected on an adjacent side; and wherein the aircraft bi-folding cowl comprises three distinct open positions:
i. a first position, wherein the inner surface of the upper portion and the inner surface of the lower portion face each other;
ii. a second position, wherein the upper portion and the lower portion are partially folded along the adjacent side; and
iii. a third position, wherein the inner surface of the upper portion and the inner surface of the lower portion face each other and the outer surface of the upper portion lays on a top surface of the aircraft.

14. The aircraft bi-folding cowl of claim 13, wherein the aircraft bi-folding cowl is attached to a track to guide the opening of the aircraft bi-folding cowl to one or more of the three distinct open positions.

15. The aircraft bi-folding cowl of claim 13, wherein the aircraft bi-folding cowl, when in the second position, is supported by a structure on a firewall.

16. The aircraft bi-folding cowl of claim 13, wherein the aircraft bi-folding cowl, when in the second position, is supported by one or more of: a hold open rod assembly, a quick release pin assembly, and a strut channel assembly.

* * * * *